(12) United States Patent
Kushida et al.

(10) Patent No.: US 7,274,516 B2
(45) Date of Patent: Sep. 25, 2007

(54) ZOOM LENS AND CAMERA

(75) Inventors: Taro Kushida, Suwa (JP); Nobumasa Kambayashi, Suwa (JP); Shinji Miyahara, Matsumoto (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/432,059

(22) Filed: May 11, 2006

(65) Prior Publication Data
US 2007/0115560 A1    May 24, 2007

(30) Foreign Application Priority Data
Nov. 18, 2005    (JP)    ............... 2005-334128

(51) Int. Cl.
*G02B 15/14*    (2006.01)
*G02B 13/18*    (2006.01)
*G02B 9/34*    (2006.01)

(52) U.S. Cl. ............... 359/687; 359/715; 359/774

(58) Field of Classification Search ............... 359/554, 359/557, 684–686, 715, 740, 774; 396/52; 348/208.99
See application file for complete search history.

(56) References Cited

U.S. PATENT DOCUMENTS

| | | | |
|---|---|---|---|
| 5,666,229 A * | 9/1997 | Ohtake ............... | 359/683 |
| 6,754,446 B2 * | 6/2004 | Hagimori et al. ............... | 396/72 |
| 6,943,959 B2 * | 9/2005 | Homma ............... | 359/682 |
| 6,975,462 B2 * | 12/2005 | Mihara ............... | 359/687 |
| 7,145,730 B2 * | 12/2006 | Mihara ............... | 359/686 |
| 2004/0095653 A1 * | 5/2004 | Miyauchi ............... | 359/687 |
| 2006/0056052 A1 * | 3/2006 | Matsui ............... | 359/687 |
| 2006/0066955 A1 * | 3/2006 | Satori et al. ............... | 359/687 |
| 2006/0082898 A1 * | 4/2006 | Shin et al. ............... | 359/687 |

FOREIGN PATENT DOCUMENTS

| | | |
|---|---|---|
| JP | 57-138612 | 8/1982 |
| JP | 8-248318 | 9/1996 |
| JP | 2000-131610 | 5/2000 |
| JP | 2003-202500 | 7/2003 |
| JP | 2005-173191 | 6/2005 |

\* cited by examiner

*Primary Examiner*—Scott J. Sugarman
*Assistant Examiner*—DaWayne A Pinkney
(74) *Attorney, Agent, or Firm*—Thomas J. Strouse

(57) ABSTRACT

To obtain a high imaging performance even for a relatively long focal length in a zoom lens provided with an optical-path bending member for bending an optical path. The following are included: a first group of lenses G1 having a positive refracting power, a second group of lenses G2 having a negative refracting power, a third group of lenses G3 having a positive refracting power, and a fourth group of lenses G4 having a positive refracting power arranged in that order from the object side to the image surface side. Zooming is performed by moving the second group of lenses G2 and fourth group of lenses G4 along an optical axis. The first group of lenses G1 is constituted of a group of positive lenses L1 having a positive refracting power and an optical-path bending member L2 for bending an optical path arranged in that order from the object side to the image face side.

9 Claims, 13 Drawing Sheets

ZOOM LENS AND CAMERA

FIELD OF THE INVENTION

The present invention relates to a zoom lens and a camera provided with the zoom lens.

BACKGROUND OF THE INVENTION

In recent years, there has been a demand for reducing size and thickness of a digital camera. There has also been a demand for reducing size, thickness, and cost of an image pickup optical system mounted on a digital camera. To meet these demands, an image-pickup optical system which has a reduced number of optical elements and is provided with an optical element for bending an optical path, such as a prism, has been put into practical use.

In addition, there has been a demand for a telephoto zoom lens which accommodates high pixel counts of a solid-state image pickup device such as a CCD by finely correcting an aberration, as well as providing for a long focal length while being sufficiently bright, providing f-number in the order of 5.0 or less, in order to increase the added value of a product.

For example, Japanese Patent Laid-Open Publication No. Sho 57-138612 discloses a telephoto zoom lens constituted of a first group of lenses having a positive refracting power, second group of lenses having a negative refracting power, third group of lenses having a positive refracting power, and fourth group of lenses having a positive refracting power, from the object side in that order.

However, the telephoto zoom lens disclosed in Japanese Patent Laid-Open Publication No. Sho 57-138612 has a linear optical axis and is not suitable for an image pickup device such as a thin digital camera demanded nowadays.

However, Japanese Patent Laid-Open Publication No. 2003-202500, Japanese Patent Laid-Open Publication No. Hei 8-248318, Japanese Patent Laid-Open Publication No. 2000-131610, and Japanese Patent Laid-Open Publication No. 2005-173191 disclose an image pickup lens system constituted so that a high imaging performance can be obtained while it is compact and thin by providing an optical-path bending member such as a prism for bending the optical path for a first group of lenses.

FIG. 4 of Japanese Patent Laid-Open Publication No. 2003-202500 discloses an image pickup lens system in which a concave meniscus lens whose convex face is oriented toward the object side and a Plano convex lens whose convex face is oriented toward the object side are arranged from the object side in that order to the object side of a right-angle prism. Furthermore, FIG. 5 of Japanese Patent Laid-Open Publication No. 2003-202500 discloses an image pickup lens system in which a biconcave lens, biconvex lens, and Plano convex lens whose convex face is oriented toward the object side are arranged in that order from the object side to the object side of a right-angle prism.

That is, Japanese Patent Laid-Open Publication No. 2003-202500 discloses an image pickup lens system in which a lens system having a positive refracting power is disposed to the object side of a right-angle prism. However, in the case of the image pickup lens system in which a lens system having a positive refracting power is disposed at the object side of the right-angle prism shown in FIGS. 4 and 5 of Japanese Patent Laid-Open Publication No. 2003-202500 because lenses disposed to the object side of the right-angle prism are separated from each other, the optical axis at the object side of the reflection face of the right-angle prism becomes long. Therefore, this may be an obstacle in reducing size and thickness of a camera.

Moreover, Japanese Patent Laid-Open Publication No. Hei 8-248318 and Japanese Patent Laid-Open Publication No. 2000-131610 disclose an image pickup lens system in which a lens having a negative refracting power is disposed to the object side of a prism for bending an optical path as a lens constituting a first group of lenses. Furthermore, Patent Document 5 discloses an image pickup lens system in which a first group of lenses is constituted of a prism having a negative refracting power and a lens having a positive refracting power from the object side in that order.

The f-number is represented by "f/D", where f is the focal length of a lens and D is the entrance pupil diameter (effective diameter) of the lens. Therefore, in order to secure a certain degree of f-number at the telephoto side having a long focal length, it is necessary to secure a certain degree of large value for the entrance pupil diameter D.

Therefore, when a telephoto zoom lens having a long focal length while maintaining image brightness is arranged so that the object side of the reflection face of a prism has a negative refracting power, as shown in Japanese Patent Laid-Open Publication No. Hei 8-248318, Japanese Patent Laid-Open Publication No. 2000-131610, and Japanese Patent Laid-Open Publication No. 2005-173191, an incoming light flux diverges relative to an entrance pupil diameter. Therefore, it is necessary to use a relatively large prism or a group of lenses disposed at the image face side of the prism, which may be an obstacle in reducing size and thickness of a camera.

SUMMARY OF THE INVENTION

It is an advantage of the present invention to obtain a high imaging performance even with a relatively long focal length in a zoom lens provided with an optical-path bending member for bending an optical path.

A zoom lens of the present invention includes a first group of lenses having a positive refracting power, a second group of lenses having a negative refracting power, a third group of lenses having a positive refracting power, and a fourth group of lenses having a positive refracting power arranged in that order from the object side to the image side, and is constituted so as to perform zooming by moving the second group of lenses and the fourth group of lenses along the optical axis. The first group of lenses is constituted of a group of positive lenses having a positive refracting power and an optical-path bending member for bending an optical path from the object side in that order to the image side.

The group of positive lenses is constituted of a single lens having a positive refracting power for example. Moreover, it is permissible for the group of positive lenses to be constituted of a cemented lens obtained by cementing a single lens having a negative refracting power with a single lens having a positive refracting power from the object side to the image face side in that order. Furthermore, it is permissible for the group of positive lenses to be constituted of a cemented lens obtained by cementing a single lens having a negative refracting power and a single lens having a positive refracting power and a single lens having a positive refracting power arranged in that order from the object side to the image side.

In this case, the optical-path bending member is disposed towards the most image face side in the first group of lenses.

Moreover, it is preferable to satisfy a relation of $1.0 < f1/fw < 3.5$ where f1 is the focal length of all lens systems constituting the first group of lenses disposed to the object side of the optical-path bending member and fw is the focal length of all lens systems constituting the zoom lens at wide angle end.

Additionally, it is preferable for a zoom lens of the present invention to move the fourth group of lenses toward the third group of lenses along an optical path when focusing from an infinite object to a near range object, and to satisfy a relationship of $0.55<\beta 4_T<0.92$, $0.8<|\beta 4_T/\beta 4_W|<2.0$, and $0.04<|D34_W/f4|<0.4$, where $\beta 4_W$ is the lateral magnification of the fourth group of lenses when focusing on an infinite distance object at a wide angle end, $\beta 4_T$ is the lateral magnification of the fourth group of lenses when focusing on an infinite distance object at a telephoto end, $D34_W$ is the air gap between the third group of lenses and the fourth group of lenses at a wide angle end, and f4 is the synthetic focal length of the fourth group of lenses.

Furthermore, it is preferable for the optical-path bending member to be a prism using a glass material for satisfying a relationship of $1.6<nd<1.85$ and $vd<40$, where the nd is refraction index of the optical-path bending member of d-line and vd is the Abbe number of the optical-path bending member of d-line.

Furthermore, it is preferable for a zoom lens of the present invention to satisfy a relationship of $d/fw<0.194$, where d is the maximum image height on an image face and fw is the focal length of all lens systems constituting the zoom lens at wide angle end.

According to the present invention, a first group of lenses is constituted of a group of positive lenses having a positive refracting power and an optical-path bending member for bending an optical path from the object side in that order to the image side. Therefore, it is possible to relatively shorten the optical axis at the object side of the optical-path bending member while also securing a relatively bright f-number in the telephoto-side long focal length.

DETAILED DESCRIPTION OF THE INVENTION

Figure 1:
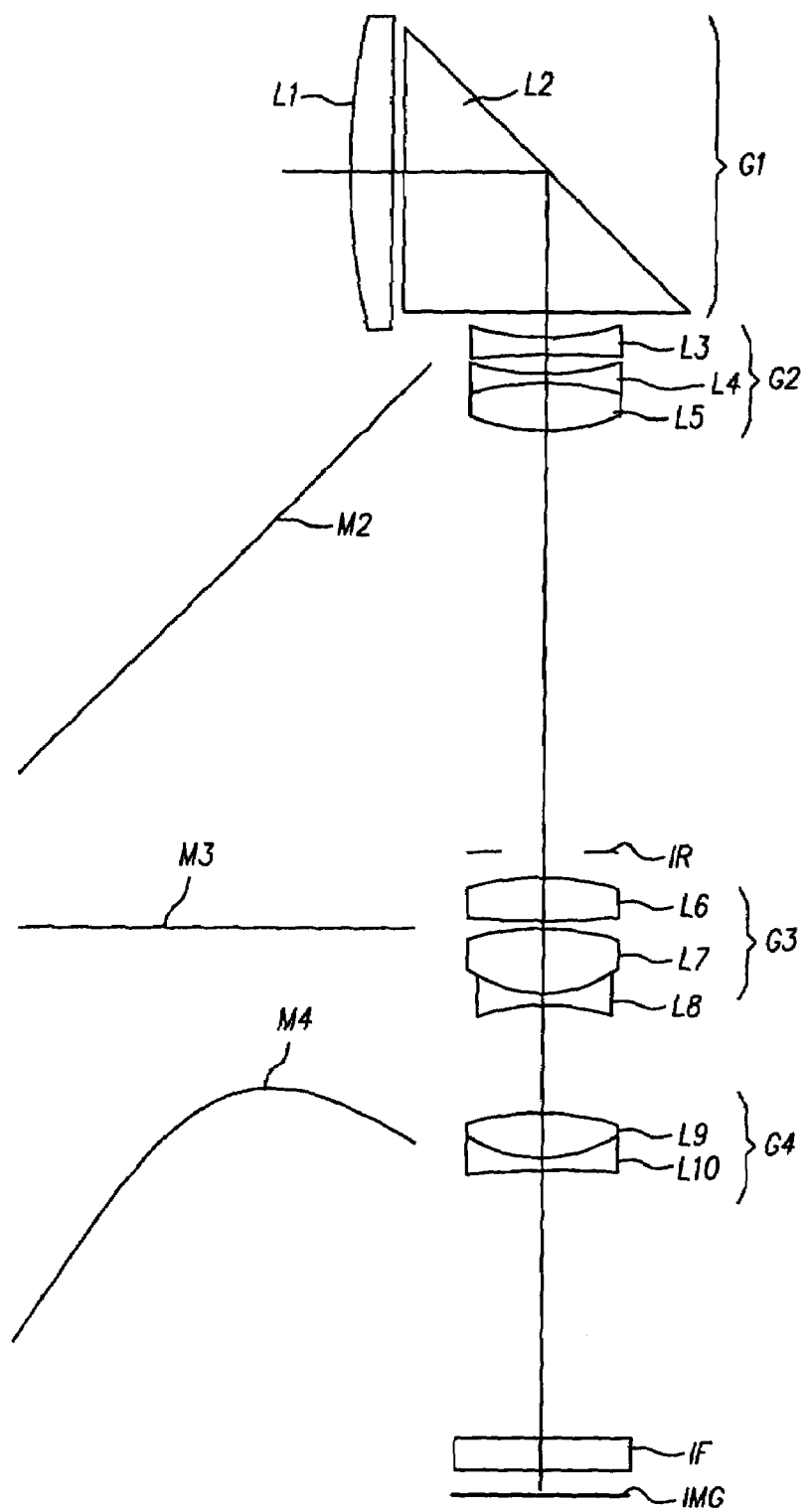
FIG. 1 is an illustration showing an optical-axis cross section of the zoom lens of first example.

The best modes (hereafter referred to as embodiments) for executing the present invention are described below by referring to the accompanying drawings. FIGS. 1 to 4 are illustrations for a first example, FIGS. 5 to 8 are illustrations for a second example, FIGS. 9 to 12 are illustrations for a third example, and FIGS. 13 to 16 are illustrations for a fourth example.

First, matter common to each of the examples will be described.

In the following description, "Si" denotes an i-th face from the object side, "Ri" denotes the curvature radius of the face Si, "di" denotes a face interval on the optical axis between the i-th face and i+1-th face from the object side, "ndLi" denotes a refraction index of a d-line (wavelength of 587.6 nm) of a lens Li, "vdLi" denotes an Abbe number of d-line of the lens Li, "f" denotes a focal length of all lens systems, "Fno" denotes an open f-number, and "ω" denotes a half field angle.

Moreover, a lens constituted of an aspherical surface is included in the lenses used for the examples.

The aspherical lens is shown by the following expression, where "x" is the distance from the vertex of a lens face to an optical-axis direction, "y" is the distance from the vertex of the lens face to the direction vertical to the optical axis, R is paraxial curvature radius, and k, A, B, C, and D are aspherical coefficients.

$$x = \frac{(1/R)y^2}{1+\sqrt{1-(1+k)(y/R)^2}} + Ay^4 + By^6 + Cy^8 + Dy^{10}$$

The zoom lenses of the first to fourth examples are respectively constituted of a first group of lenses G1 having a positive refracting power, a second group of lenses G2 having a negative refracting power, a third group of lenses G3 having a positive refracting power, and a fourth group of lenses G4 having a positive refracting power in that order from the object side to the image face IMG as shown in FIGS. 1, 5, 9, and 13. FIGS. 1, 5, 9, and 13 respectively show the positional relation between the lens groups at wide angle ends.

Moreover, an aperture IR is disposed between the second group of lenses G2 and the third group of lenses G3. Furthermore, an optical equivalent member IF is disposed between the fourth group of lenses G4 and the image face IMG. The optical equivalent member IF is constituted of a low-pass filter, infrared cut filter, and the cover glass of a solid-state image pickup device arranged in that order from the object side to the image face side for example.

The second group of lenses G2 is mainly involved with zooming and moves from the object side to the image side along the optical axis at the time of zooming from a wide angle end to a telephoto end. The fourth group of lenses G4 compensates the movement of a focal point according to the movement of the second group of lenses G2 by moving in a non-linear manner along the optical axis.

The first group of lenses G1 is constituted of a group of positive lenses having a positive refracting power and an optical-path bending member for bending an optical path by approx. 90°.

Conventionally, in the case of a zoom lens provided with an optical-path bending member for bending an optical path, a negative lens having a negative refracting power is disposed to the object side of the optical-path bending member. By using this configuration, it is possible to make light flux from a wide field angle enter a lens at the wide angle side. However, by disposing the negative lens to the object side of the optical-path bending member, it is necessary to increase the optical-path bending member and a group of lenses disposed to the image side of the optical-path bending member in size because an incoming light flux diverges compared to the entrance pupil diameter D. Particularly, to secure a relatively bright f-number also at the telephoto side which becomes a long focal length, it is necessary to secure a certain degree of size for the entrance pupil diameter D. Therefore, in the case of a configuration in which the negative lens is disposed to the object side of the optical-path bending member, it is necessary to increase the size of the optical-path bending member and a group of lenses disposed to the image face side of the optical-path bending member.

Therefore, in the case of this example, a group of positive lenses is disposed to the object side of an optical-path bending member. Thereby, a relatively bright f-number is also secured in a long focal length at the telephoto side and it is possible to shorten the optical axis at the object side of the optical-path bending member.

Moreover, in the case of this example, an optical-path bending member is disposed to the most image face side of the first group of lenses G1. That is, a lens for constituting the first group of lenses G1 is not disposed to the image face side of the optical-path bending member. As a result, it is possible to shorten the optical axis at the image face side of the optical-path bending member while securing the moving range of the second group of lenses moving along the optical axis when performing zooming.

Figure 17:
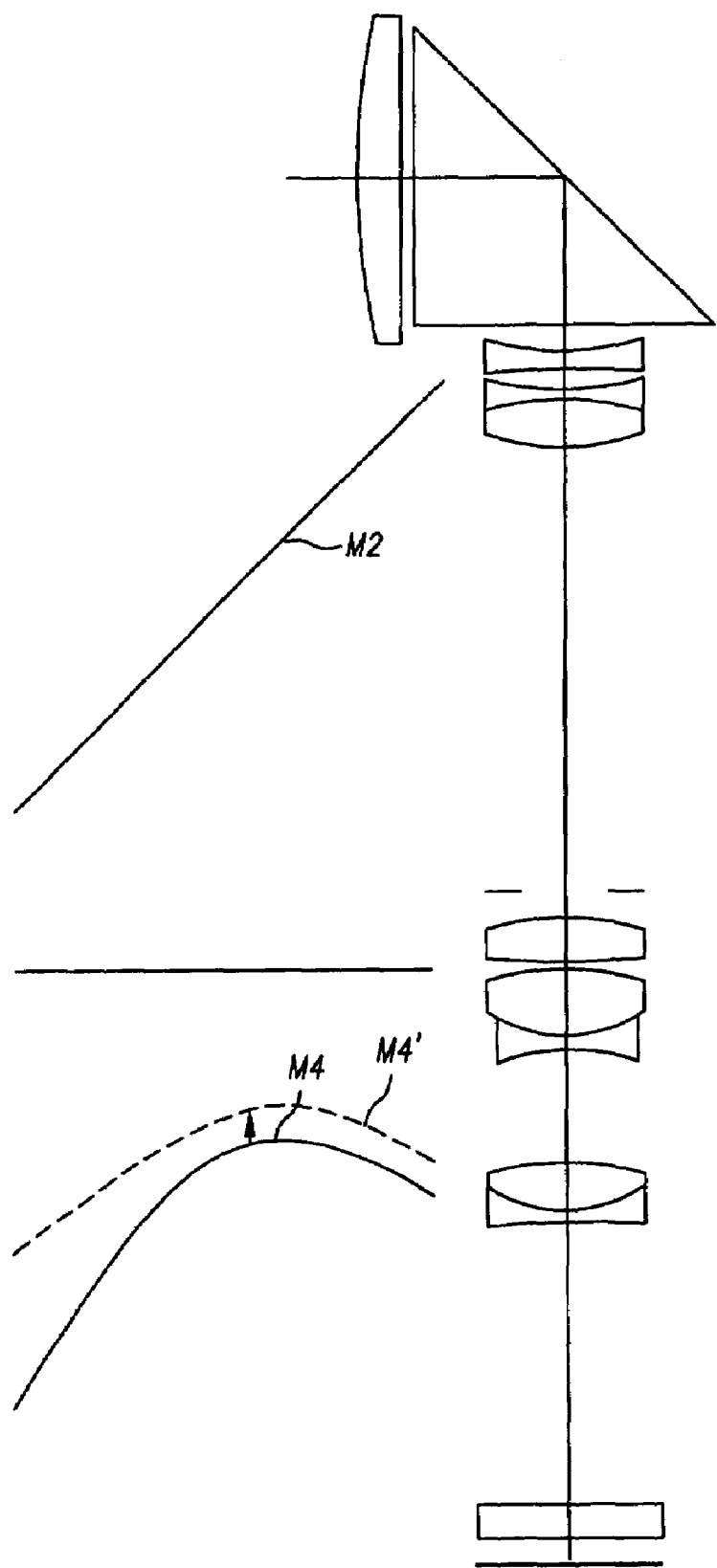
FIG. 17 is an illustration showing a state of the zooming operation of a zoom lens.

Furthermore, in the case of this example, zooming is performed when the second group of lenses G2 moves linearly as shown in movement locuses M2 and M4 in FIGS. 1, 5, 9, and 13. Furthermore, to correct the movement of a focus position due to the movement of the second group of lenses G2, the fourth group of lenses G4 moves nonlinearly. Particularly, as shown by movement locuses M4 and M4' in FIG. 17, when the fourth group of lenses is moved to the object side to focus, it is preferable to move the second group of lenses G2 and fourth group of lenses G4 so as to satisfy the following expressions (1) to (3).

$$0.55 < \beta 4_T < 0.92 \quad (1)$$

$$0.8 < |\beta 4_T / \beta 4_W| < 2.0 \quad (2)$$

$$0.04 < |D34_W / f4| < 0.4 \quad (3)$$

In this case, it is assumed that the lateral magnification of the fourth group of lenses G4 is $\beta 4_W$ when focusing on an infinite object at a wide angle end, the lateral magnification of the fourth group of lenses G4 when focusing an infinite object at a telephoto end is $\beta 4_T$, the air gap between the third group of lenses G3 and the fourth group of lenses G4 at a wide angle end is $D34_W$, and the synthetic focal length of the fourth group of lenses G4 is f4.

Expression (1) shows the condition of the air gap between the fourth group of lenses G4 and the image surface IMG at a telephoto end focal length. When the lateral magnification $\beta 4_T$ of the fourth group of lenses G4 exceeds the upper limit of the expression (2), it is difficult to secure a space in which the optical equivalent member IF is disposed between the fourth group of lenses G4 and the image face IMG. However, when the lateral magnification $\beta 4_T$ of the fourth group of lenses G4 does not reach the lower limit of the expression (2), a space for the fourth group of lenses G4 to move to the third group of lenses-G3 side is restricted when adjusting focus. Therefore, the lower limit of a distance up to an object which can be focused by moving the fourth group of lenses G4 along the optical axis is restricted at the time of close range photographing. That is, the shortest object distance at which imaging is preferably performed is increased.

Moreover, the expression (2) shows a condition for the difference between the air gap between the fourth group of lenses G4 and the image face IMG when performing zooming at a wide angle end and the air distance between the fourth group of lenses G4 and the image face IMG when performing zooming at a telephoto end. When the difference exceeds the upper limit of the expression (2), the moving range of the fourth group of lenses G4 when performing zooming increases, the length of a group of lenses constituting a zoom lens in the optical axis direction increases, and these become obstacles for decrease in size and thickness. It is more preferable that the expression (2) satisfies a relation of $0.8 < |\beta 4_T / \beta 4_W| < 1.4$.

Moreover, the expression (3) shows a condition of the air gap between the third group of lenses G3 and the fourth group of lenses G4 at a wide-angle-end focal length. When $|D34_W / f4|$ does not reach the lower limit of the expression (3), a space for the fourth group of lenses G4 to move to the third group of lenses-G3 side is restricted when adjusting a focus. Therefore, the lower limit of a distance up to an object which can be focused by moving the fourth group of lenses G4 along the optical axis is restricted at the time of close-range photographing.

As described above, it is possible to shorten the entire length of the optical axis while securing the movement space of the fourth group of lenses G4 necessary for focus adjustment in connection with focus movement due to zooming by moving the second group of lenses G2 and fourth group of lenses G4 so as to satisfy the expressions (1) to (3).

Moreover, it is preferable that |f1/fw| satisfies the following expression (4), where f1 is the focal length of an optical member (that is, the above-described group of positive lenses) constituting the first group of lenses G1 disposed to the object side of the optical-path bending member and fw is the focal length of all lens systems constituting a zoom lens at a wide angle end:

$$1.0 < |f1/fw| < 3.5 \quad (4)$$

When |f1/fw| does not reach the lower limit of the expression (4), the positive refracting power of an optical member disposed to the object side of the optical-path bending member becomes too strong. Therefore, it is difficult to secure a relatively long focal length and constitute a telephoto zoom lens by disposing this lens. Moreover, it is difficult to secure an optical-path length sufficient to bend the optical path of the light ray refracted and transmitted in this optical member by approx. 90° by the optical-path bending member.

Furthermore, when |f1/fw| exceeds the upper limit of the expression (4), the positive refracting power of the optical member disposed to the object side of the optical-path bending member becomes too weak. Therefore, it is necessary to increase effective diameters of the optical-path bending member, second group of lenses G2, and third group of lenses G3 to be disposed to the image side of the optical member and lengthen the entire optical axis. Therefore, this case becomes an obstacle for decrease of a camera in size and thickness. It is more preferable that the expression (4) satisfies a relationship of $1.8 < f1/fw < 3.5$.

Moreover, when using a glass prism for the optical-path bending member and assuming the refraction index of d-line of the glass prism as nd and the Abbe number of the d-line as vd, it is preferable that the following expressions (5) and (6) are satisfied.

$$1.6 < nd < 1.85 \quad (5)$$

$$vd < 40 \quad (6)$$

A glass material in which the refraction index nd exceeds 1.85 which is the upper limit of the expression (5) and the Abbe number vd exceeds 40 which is the upper limit of the expression (6) is generally expensive, and it becomes an obstacle for reduction of the manufacturing cost.

EXAMPLE 1

Matter specific to the zoom lenses of the first to fourth examples will be respectively described below. The zoom lenses of the first to fourth examples can be mounted on various cameras such as a digital camera, monitoring camera, and in-vehicle camera.

Moreover, in the case of each of the following examples, an optical system which can be changed in a range in which the maximum half field angle ω mainly effective for infinite focusing is approx. 11° or less is described.

In general, it is known that the following relationship is effected between ω, d, and f, where d is the effective image circle diameter of an image (maximum image height on image) and f is a focal length.

$$d = f \times \tan \omega$$

That is, in the case of each of the following examples, a zoom lens system in which "d/fw" satisfies the following expression, where fw is the focal length of all lens systems constituting a zoom lens at a wide angle end, is described.

$$d/fw < \tan(11°) = 0.194 \quad (7)$$

FIRST EXAMPLE

In the case of the zoom lens of the first example, a group of positive lenses constituting the first group of lenses G1 is constituted of a single lens L1 having a positive refracting power as shown in FIG. 1. The second group of lenses G2 is constituted of a biconcave lens L3 and a cemented lens obtained by cementing a biconcave lens L4 and biconvex lens L5 from the object side in that order. The third group of lenses G3 is constituted of a biconvex lens L6 and a cemented lens obtained by cementing a biconvex lens L7 and biconcave lens L8 from the object side in that order. In addition, the fourth group of lenses G4 is constituted of a cemented lens obtained by cementing a biconvex lens L9 and biconcave lens L10.

In this case, it is preferable that the single lens L1 uses a glass material having an Abbe number of 62 or more. As a result, it is possible to preferably correct axial chromatic aberration which generally becomes a problem at the telephoto side.

Table 1 shows numerical data values of the zoom lens of the first example. In Table 1, three values shown after "f", "Fno", and "ω" show a focal length, f-number, and half field angle respectively in a short focal length end (wide angle end), intermediate focal length, and long focal length end (telephoto end).

TABLE 1

| | | | | | | | | |
|---|---|---|---|---|---|---|---|---|
| \multicolumn{9}{c}{f = 20.0-28.28-40.01  Fno = 4.71-4.71-4.63  ω = 10.5°-7.3°-5.1°} |
| Lens number | Face number | Curvature radius R | | Face interval d | | Refraction index ndL | Abbe number vdL | |
| L1 | S1 | R1 | 31.624 | d1 | 1.800 | ndL1 | 1.4970 | vdL1 | 81.6 |
| | S2 | R2 | 1380.000 | d2 | 0.600 | — | | — | |
| L2 | S3 | R3 | INF | d3 | 13.000 | ndL2 | 1.8467 | vdL2 | 23.8 |
| | S4 | R4 | INF | d4 | Variable | — | | — | |
| L3 | S5 | R5 | −12.672 | d5 | 0.800 | ndL3 | 1.8467 | vdL3 | 23.8 |
| | S6 | R6 | 53.978 | d6 | 0.600 | — | | — | |
| L4 | S7 | R7 | −15.118 | d7 | 0.700 | ndL4 | 1.7495 | vdL4 | 35.0 |
| L5 | S8 | R8 | 10.353 | d8 | 2.000 | ndL5 | 1.8052 | vdL5 | 25.5 |
| | S9 | R9 | −11.050 | d9 | Variable | — | | — | |
| IR | S10 | R10 | — | d10 | 0.500 | — | | — | |
| L6 | S11 | R11 | 10.737 | d11 | 2.000 | ndL6 | 1.5891 | vdL6 | 61.2 |
| | S12 | R12 | −52.372 | d12 | 0.500 | — | | — | |
| L7 | S13 | R13 | 12.562 | d13 | 2.800 | ndL7 | 1.5891 | vdL7 | 61.3 |
| L8 | S14 | R14 | −7.281 | d14 | 0.550 | ndL8 | 1.6477 | vdL8 | 33.8 |
| | S15 | R15 | 7.674 | d15 | Variable | — | | — | |
| L9 | S16 | R16 | 23.274 | d16 | 2.000 | ndL9 | 1.5814 | vdL9 | 40.9 |
| L10 | S17 | R17 | −5.950 | d17 | 0.600 | ndL10 | 1.5891 | vdL10 | 61.3 |
| | S18 | R18 | 41.160 | d18 | Variable | — | | — | |
| IF | S19 | R19 | INF | d19 | 1.500 | ndL11 | 1.5168 | vdL11 | 64.2 |
| | S20 | R20 | INF | d20 | — | — | | — | |

Moreover, the face S12 at the image face side of the biconvex lens L6 constituting the third group of lenses G3 is constituted of an aspherical surface. Table 2 shows aspherical coefficients on the face S12.

TABLE 2

| Face number | k | A | B | C | D |
|---|---|---|---|---|---|
| S12 | −3.7600E−01 | 0.0000E+00 | −8.4193E−07 | 7.4374E−08 | 0.0000E+00 |

"E" in Table 2 denotes an exponential notation using 10 as the base part (the same applies to Tables 6, 10, and 14 below.)

Moreover, Table 3 shows values at a short focal length end, intermediate focal length, and long focal length end of face intervals d4, d9, d15, and d18 variable due to zooming.

TABLE 3

| Focal length f | 20.001 | 28.284 | 40.014 |
|---|---|---|---|
| Face interval d4 | 1.000 | 10.371 | 19.403 |
| Face interval d9 | 19.902 | 10.531 | 1.500 |
| Face interval d15 | 5.037 | 4.956 | 9.681 |
| Face interval d18 | 12.372 | 12.453 | 7.727 |

In addition, Table 4 shows values of parameters of conditional expressions (1) to (6) in the first example.

TABLE 4

| (1) | f1/fw | 3.25 |
|---|---|---|
| (2) | β4T | 0.816 |
| (3) | \|β4T/β4w\| | 1.057 |
| (4) | \|D34w/f4\| | 0.05 |
| (5) | nd | 1.8467 |
| (6) | νd | 23.8 |

Figure 2:
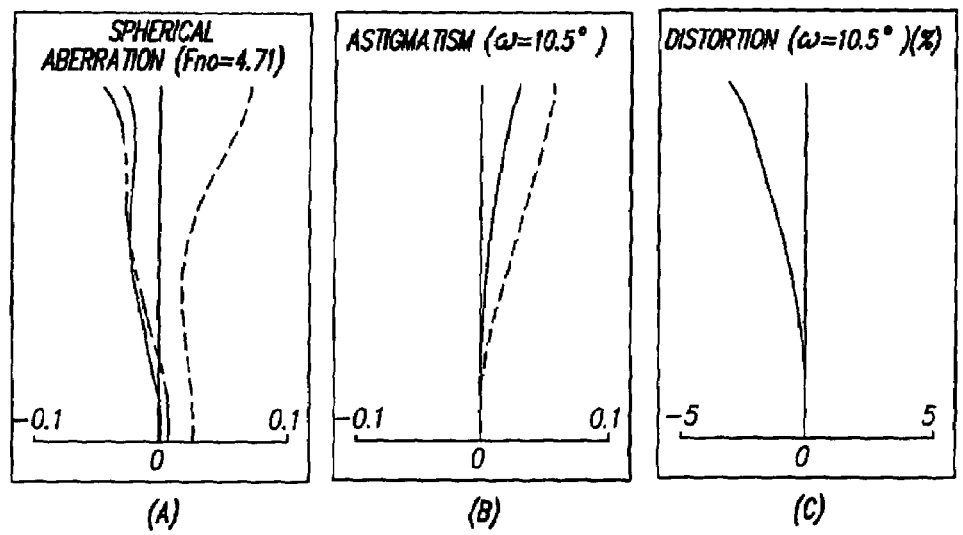
FIGS. 2A to 2C are illustrations showing various aberration diagrams at the short focal length end of the first example.
Figure 3:
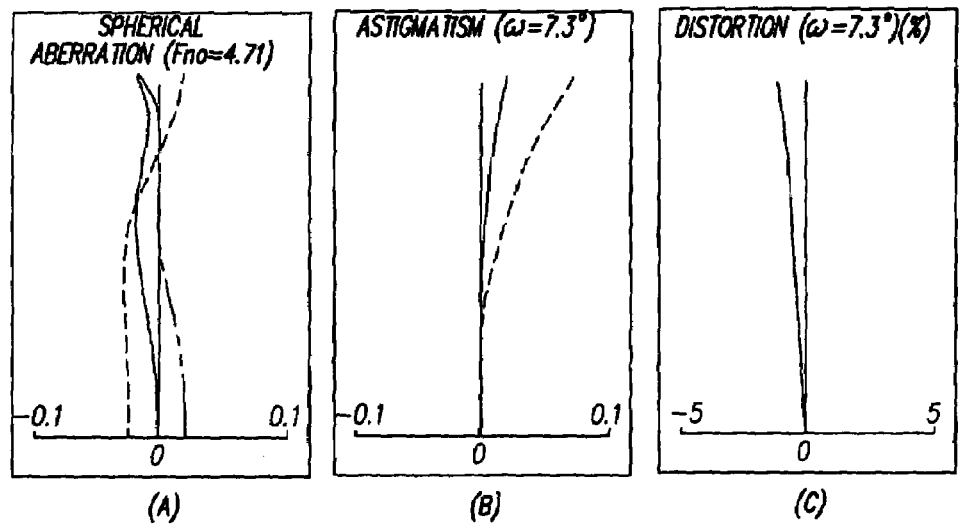
FIGS. 3A to 3C are illustrations showing various aberration diagrams of the intermediate focal length of the first example.
Figure 4:
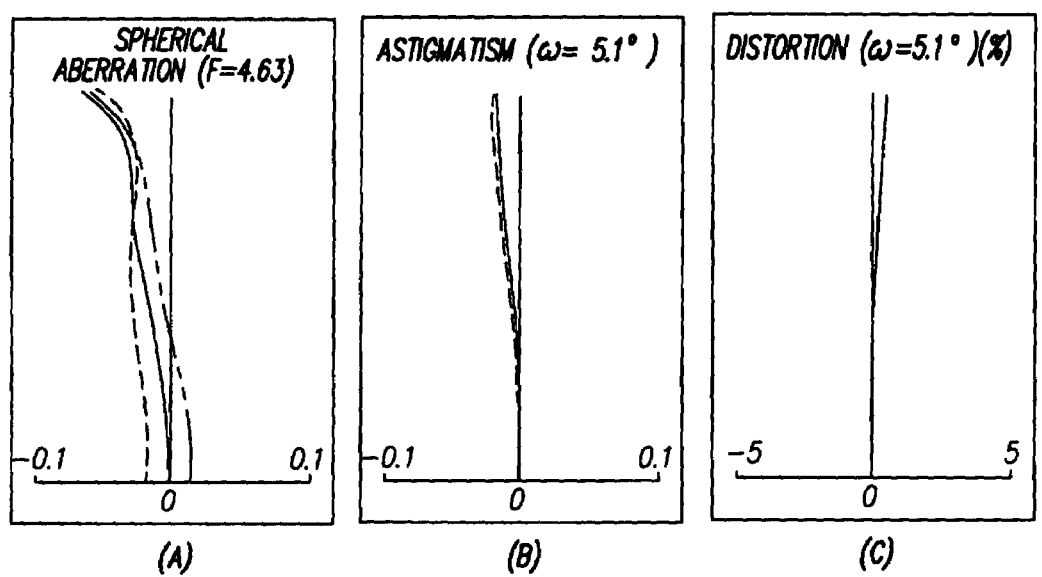
FIGS. 4A to 4C are illustrations showing various aberration diagrams of the long focal length end of the first example.

FIGS. 2 to 4 are aberration diagrams at a short focal length end, intermediate focal length, and long focal length end of the zoom lens of the first example. In FIGS. 2 to 4, <A> denotes spherical aberration, a continuous line denotes the d-line, a broken line denotes the F-line, and a long dashed short-dashed line denotes spherical aberration on the C-line. Moreover, <B> denotes astigmatism, a continuous line denotes a value on a sagittal image surface, and a broken line denotes a value on a tangential image surface. <C> denotes a distortion. The same applies to FIGS. 6 to 8 and FIGS. 10 to 12 below.

SECOND EXAMPLE

Figure 5:
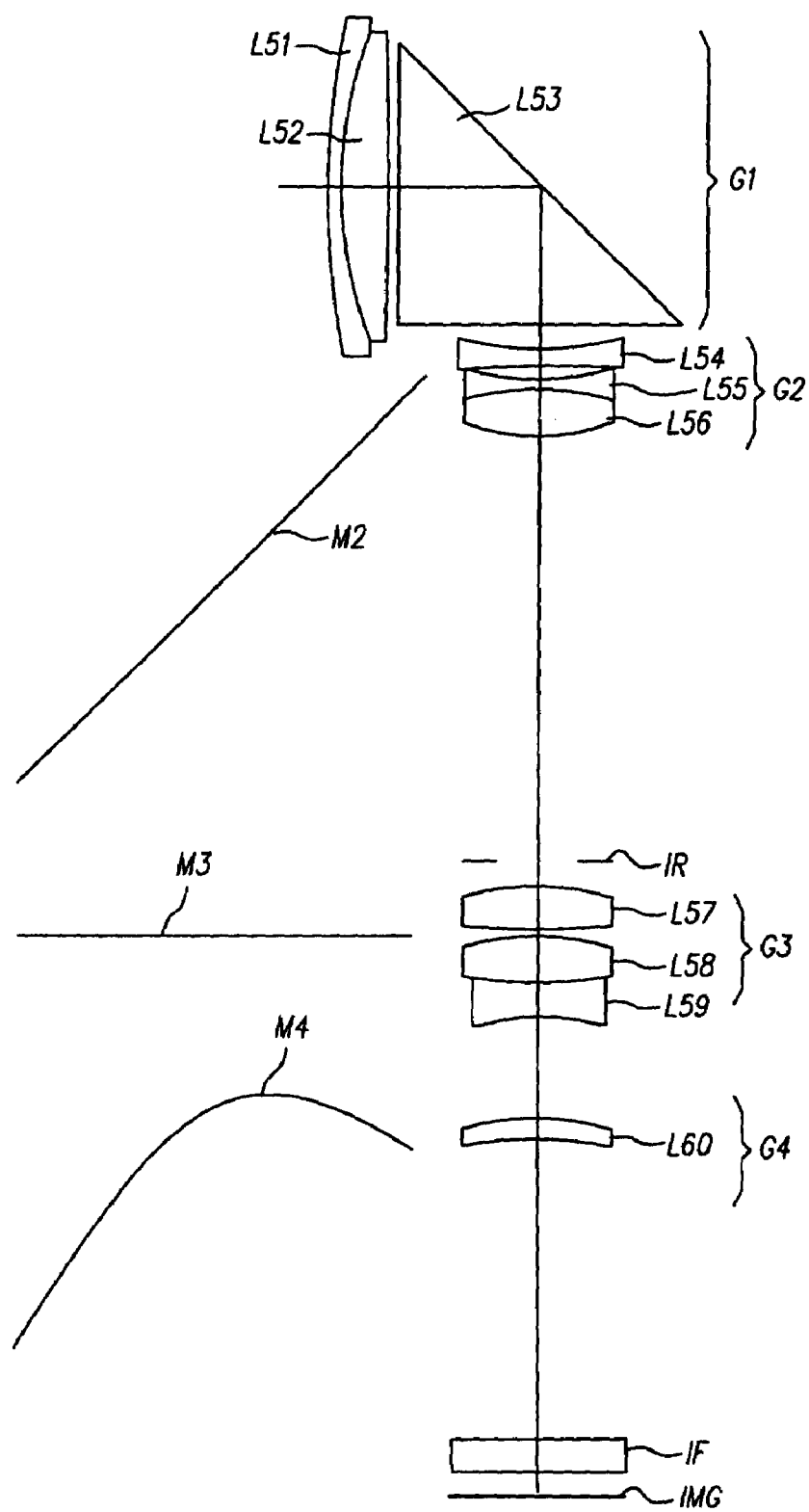
FIG. 5 is an illustration showing the optical-axis cross section of the zoom lens of second example.

A second example will now be described. As shown in FIG. 5, the second example is different from the first example in that a group of positive lenses constituting the first group of lenses G1 is constituted of a cemented lens obtained by cementing a concave meniscus lens L51 whose convex face is oriented toward the object side and having a negative refracting power and a biconvex lens L52 having a positive refracting power from the object side in that order. Moreover, the second example is different from the first example in that the fourth group of lenses G4 is constituted of a convex meniscus lens L10 whose convex face is oriented toward the object side and having a positive refracting power.

Thus, by disposing the cemented lens having a positive refracting power to the object side of the optical-path bending member, it is possible to further correct axial chromatic aberration compared to when constituting the group of positive lenses by a single lens, and thus obtain a more-preferable focusing performance. Therefore, it is possible to provide a zoom lens corresponding to a longer focal length.

Table 5 shows numerical value data of the zoom lens of the second example.

TABLE 5

| | | f = 20.5-37.40-70.00 Fno = 4.86-4.89-4.96 ω = 10.2°-5.5°-2.9° | | | | |
|---|---|---|---|---|---|---|
| Lens number | Face number | Curvature radius | Face interval d | | Refraction index ndL | Abbe number vdL |
| L51 | S1 | R1 | 22.994 | d1 | 0.750 | ndL1 | 1.7495 | vdL1 | 35.0 |
| L52 | S2 | R2 | 13.308 | d2 | 2.800 | ndL2 | 1.5891 | vdL2 | 61.3 |
| | S3 | R3 | −146.940 | d3 | 0.300 | — | | — | |
| L53 | S4 | R4 | INF | d4 | 13.000 | ndL3 | 1.8467 | vdL3 | 23.8 |
| | S5 | R5 | INF | d5 | Variable | — | | — | |
| L54 | S6 | R6 | −51.688 | d6 | 0.800 | ndL4 | 1.8161 | vdL4 | 46.6 |
| | S7 | R7 | 16.471 | d7 | 0.600 | — | | — | |
| L55 | S8 | R8 | −19.433 | d8 | 0.700 | ndL5 | 1.8061 | vdL5 | 40.7 |
| L56 | S9 | R9 | 10.774 | d9 | 1.800 | ndL6 | 1.8467 | vdL6 | 23.8 |
| | S10 | R10 | −49.283 | d10 | Variable | — | | — | |
| IR | S11 | R11 | — | d11 | 0.500 | — | | — | |
| L57 | S12 | R12 | 8.240 | d12 | 2.300 | ndL7 | 1.5891 | vdL7 | 61.2 |
| | S13 | R13 | −36.158 | d13 | 0.200 | — | | — | |
| L58 | S14 | R14 | 11.143 | d14 | 2.000 | ndL8 | 1.5891 | vdL8 | 61.3 |
| L59 | S15 | R15 | −31.377 | d15 | 0.800 | ndL9 | 1.6477 | vdL9 | 33.8 |
| | S16 | R16 | 5.614 | d16 | Variable | — | | — | |
| L60 | S17 | R17 | 13.100 | d17 | 1.500 | ndL10 | 1.4970 | vdL 10 | 81.6 |
| | S18 | R18 | 26.470 | d18 | Variable | — | | — | |
| IF | S19 | R19 | INF | d19 | 1.500 | ndL11 | 1.5168 | vdL 11 | 64.2 |
| | S20 | R20 | INF | | | — | | — | |

Figure 6:
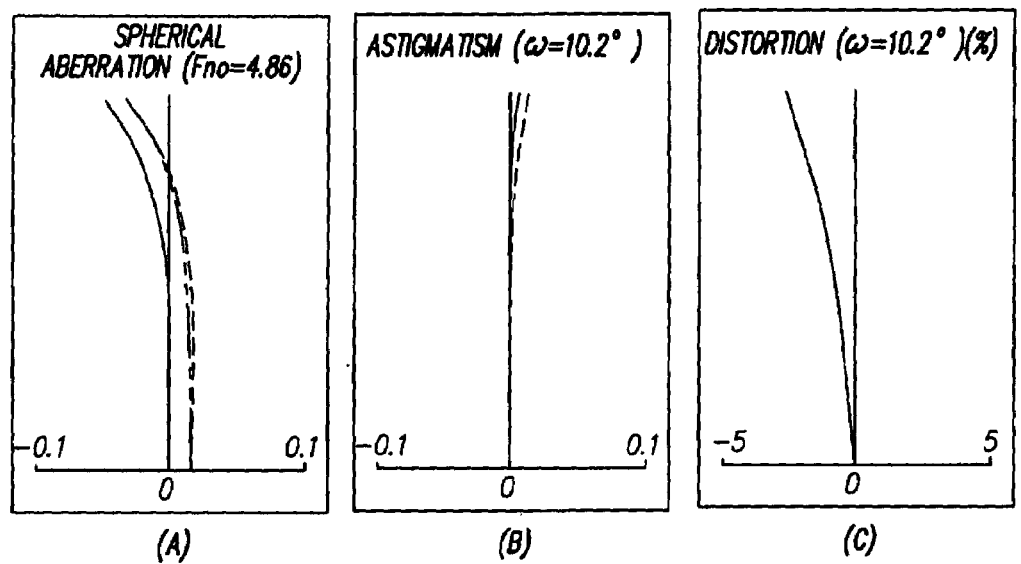
FIGS. 6A to 6C are illustrations showing various aberration diagrams of the short focal length end of the second example.

FIG. 6. shows aspherical coefficients on the face S12 at the object side of the biconvex lens L57 constituting the third group of lenses G3.

TABLE 6

| Face number | k | A | B | C | D |
|---|---|---|---|---|---|
| S12 | −9.8200E−01 | 0.0000E+00 | 0.0000E+00 | 0.0000E+00 | 0.0000E+00 |

Table 7 shows values at a short focal length end, intermediate focal length, and long focal length end of face intervals d5, d10, d16, and d18 variable by zooming.

TABLE 7

| Focal length f | 20.502 | 37.399 | 70.003 |
|---|---|---|---|
| Face interval d5 | 0.700 | 8.18 | 14.593 |
| Face interval d10 | 15.393 | 7.913 | 1.500 |
| Face interval d16 | 9.009 | 6.13 | 20.487 |
| Face interval d18 | 12.491 | 15.37 | 1.013 |

Table 8 shows values of parameters of conditional expressions (1) to (6) in the second example.

TABLE 8

| (1) | fl/fw | 1.99 |
|---|---|---|
| (2) | β4T | 0.9021 |
| (3) | \|β4T/β4w\| | 1.337 |
| (4) | \|D34w/f4\| | 0.18 |

TABLE 8-continued

| (5) | nd | 1.8467 |
|---|---|---|
| (6) | vd | 23.8 |

Figure 7:
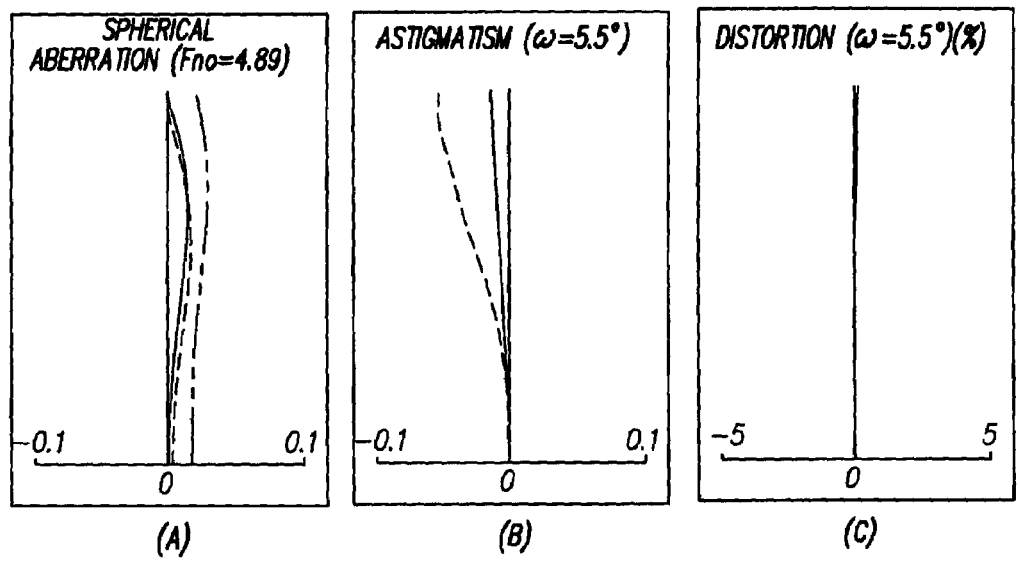
FIGS. 7A to 7C are illustrations showing various aberration diagrams of the intermediate focal length of the second example.
Figure 8:
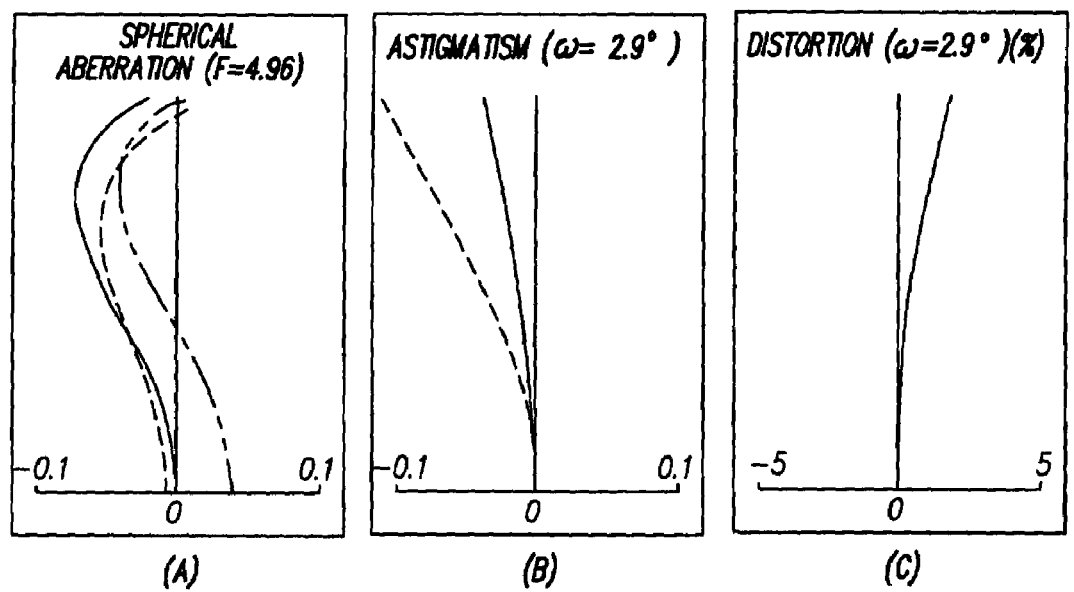
FIGS. 8A to 8C are illustrations showing various aberration diagrams of the long focal length end of the second example.

FIGS. 6 to 8 are aberration diagrams in the second example. As shown in FIGS. 6 to 8, meanings shown by <A> to <C> are the same as the case of FIGS. 2 to 4.

THIRD EXAMPLE

Figure 9:
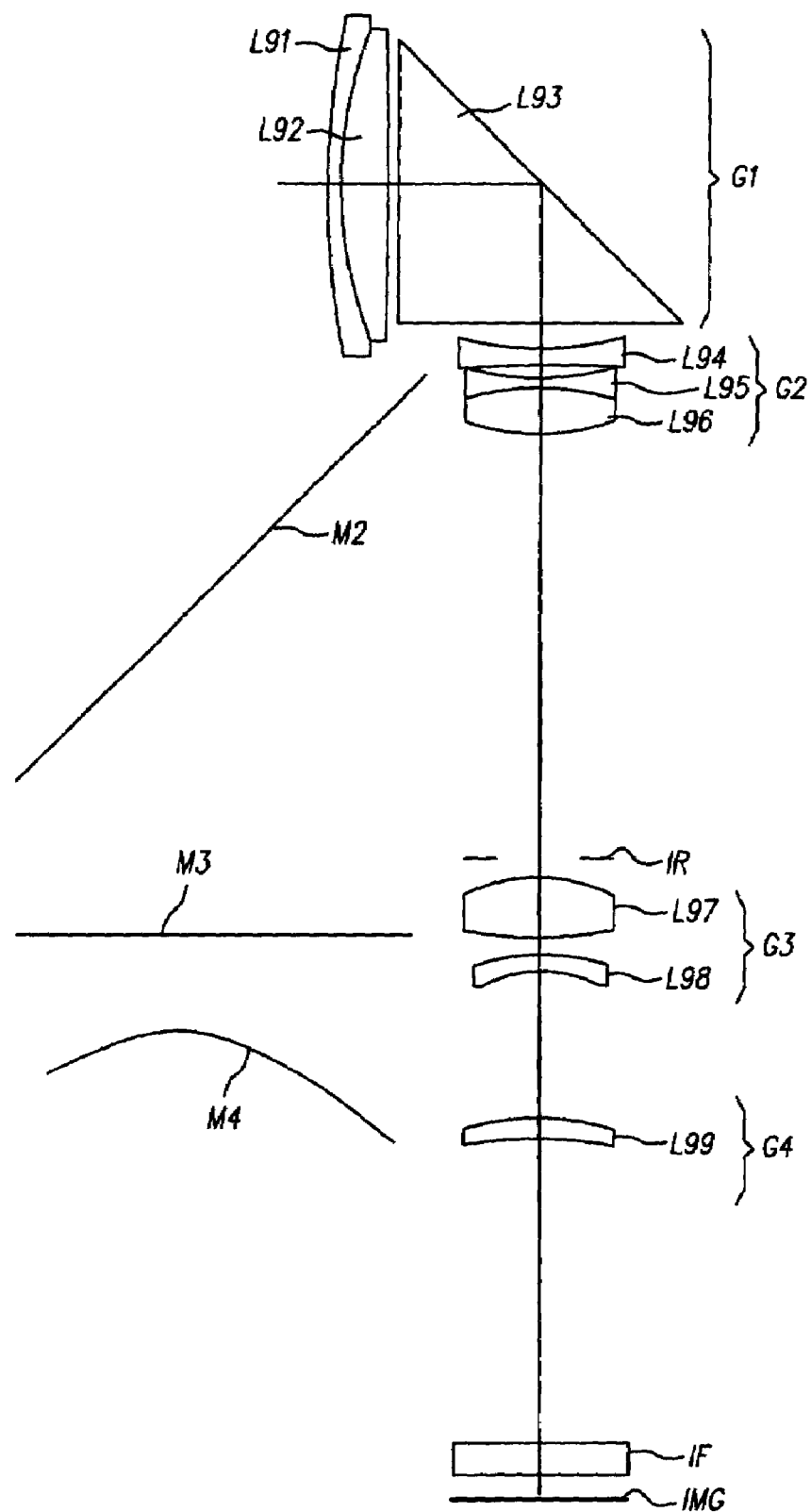
FIG. 9 is an illustration showing the optical-axis cross section of the zoom lens of third example.

A third example will be described below. As shown in FIG. 9, the third example is different from the second example in that the third group of lenses G3 is constituted of the biconvex lens L97 having a positive refracting power and a concave meniscus lens L98 whose convex face is oriented toward the object side and having a negative refracting power, arranged in that order from the object side.

Table 9 shows numerical value data of the zoom lens of the third example.

TABLE 9

| f = 20.0-37.11-59.99 Fno = −4.76-4.99-4.92 ω = 10.5°-5.5°-3.4° | | | | | | | | | |
|---|---|---|---|---|---|---|---|---|---|
| Lens number | Face number | Curvature radius R | | Face interval d | | Refraction index ndL | | Abbe number vdL | |
| L91 | S1 | R1 | 24.638 | d1 | 0.750 | ndL1 | 1.7495 | vdL1 | 35.0 |
| L92 | S2 | R2 | 13.773 | d2 | 2.800 | ndL2 | 1.5891 | vdL2 | 61.3 |
|  | S3 | R3 | 124.680 | d3 | 0.400 | — | — | — | — |
| L93 | S4 | R4 | INF | d4 | 13.000 | ndL3 | 1.8467 | vdL3 | 23.8 |
|  | S5 | R5 | INF | d5 | Variable | — | — | — | — |
| L94 | S6 | R6 | −54.920 | d6 | 0.800 | ndL4 | 1.8161 | vdL4 | 46.6 |
|  | S7 | R7 | 17.080 | d7 | 0.600 | — | — | — | — |
| L95 | S8 | R8 | −22.764 | d8 | 0.700 | ndL5 | 1.8061 | vdL5 | 40.7 |
| L96 | S9 | R9 | 8.650 | d9 | 1.800 | ndL6 | 1.8467 | vdL6 | 23.8 |
|  | S10 | R10 | −198.370 | d10 | Variable | — | — | — | — |
| IR | S11 | R11 | — | d11 | 0.500 | — | — | — | — |
| L97 | S12 | R12 | 6.219 | d12 | 3.000 | ndL7 | 1.5891 | vdL7 | 61.2 |
|  | S13 | R13 | −23.520 | d13 | 0.917 | — | — | — | — |
| L98 | S14 | R14 | 11.742 | d14 | 0.800 | ndL8 | 1.5891 | vdL8 | 61.3 |
|  | S15 | R15 | 4.934 | d15 | Variable | — | — | — | — |
| L99 | S16 | R16 | 9.738 | d16 | 1.500 | ndL9 | 1.4875 | vdL9 | 70.4 |
|  | S17 | R17 | 16.563 | d17 | Variable | — | — | — | — |
| IF | S18 | R18 | INF | d18 | 1.500 | ndL10 | 1.5168 | vdL10 | 64.2 |
|  | S19 | R19 | INF | — | — | — | — | — | — |

Table 10 shows aspherical coefficients at the face S12 of the biconvex lens L97 constituting the third group of lenses G3 at the object side and image side S13 of the biconvex lens L97.

TABLE 10

| Face number | k | A | B | C | D |
|---|---|---|---|---|---|
| S12 | −1.4766E+00 | 3.3200E−04 | −7.0583E−06 | 8.1340E−09 | 0.0000E+00 |
| S13 | 1.61655E+00 | 1.7900E−04 | −8.7983E−06 | 5.1447E−08 | 0.0000E+00 |

Table 11 shows values of face intervals d5, d10, d15, and d17 variable by zooming at the short focal length end, intermediate focal length, and long focal length end.

TABLE 11

| Focal length f | 19.999 | 34.114 | 59.990 |
|---|---|---|---|
| Face interval d5 | 0.700 | 8.125 | 13.604 |
| Face interval d10 | 14.404 | 6.979 | 1.500 |
| Face interval d15 | 11.323 | 5.359 | 6.500 |
| Face interval d17 | 10.177 | 16.141 | 15.000 |

Table 12 shows values of parameters of conditional expressions (1) to (6) in the third example.

TABLE 12

| (1) | f/fw | 2.13 |
|---|---|---|
| (2) | β4T | 0.5526 |
| (3) | \|β4T/β4w\| | 0.837 |
| (4) | \|D34w/f4\| | 0.25 |
| (5) | nd | 1.8467 |
| (6) | vd | 23.8 |

Figure 10:
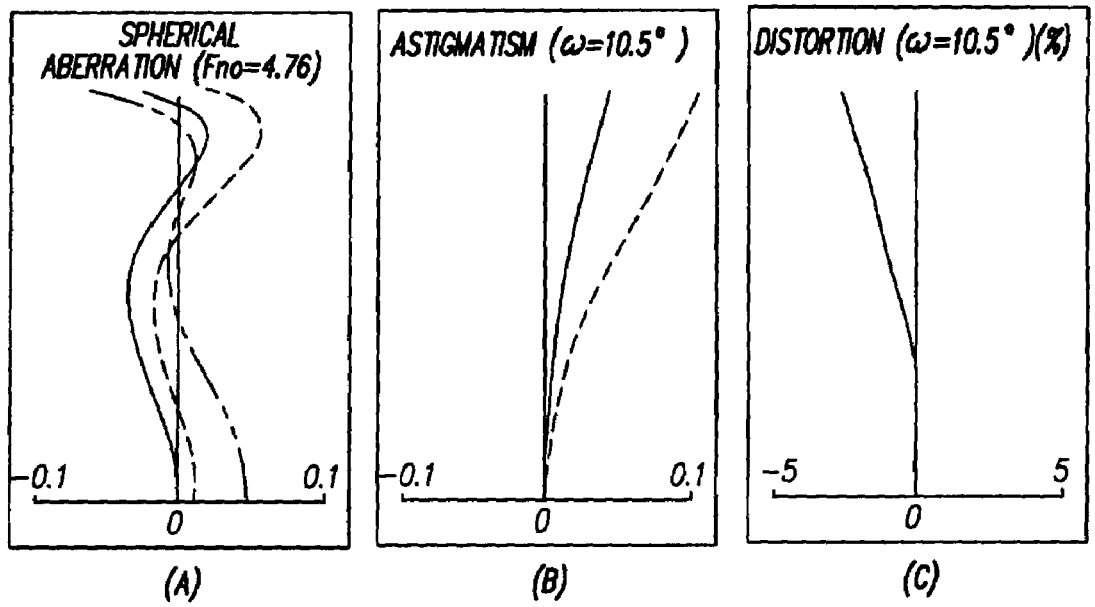
FIGS. 10A to 10C are illustrations showing various aberration diagrams of the short focal length end of the third example.
Figure 11:
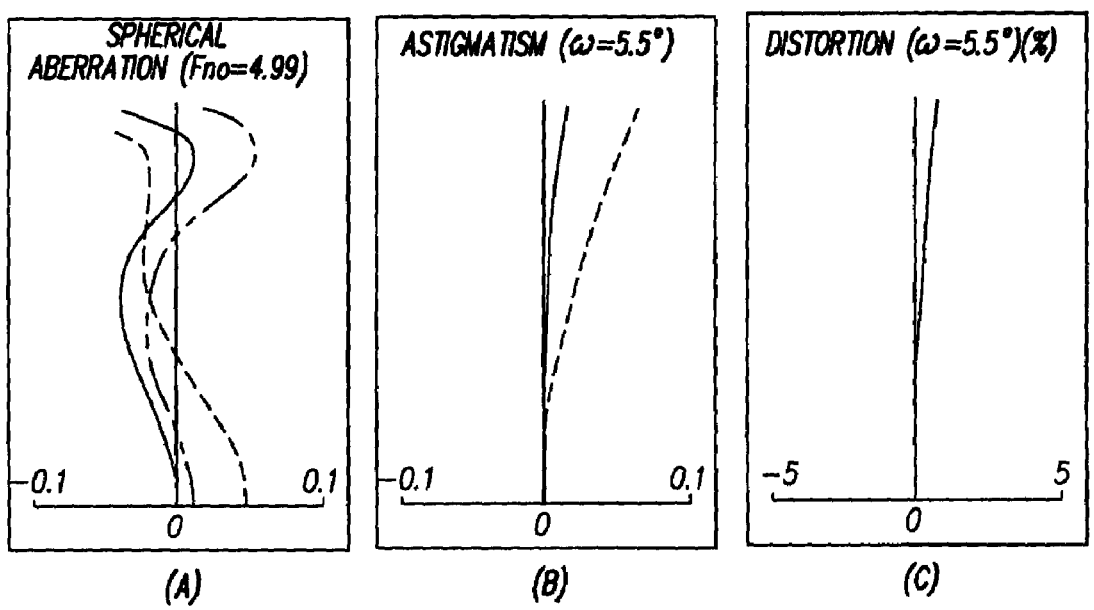
FIGS. 11A to 11C are illustrations showing various aberration diagrams of the intermediate focal length of the third example.
Figure 12:
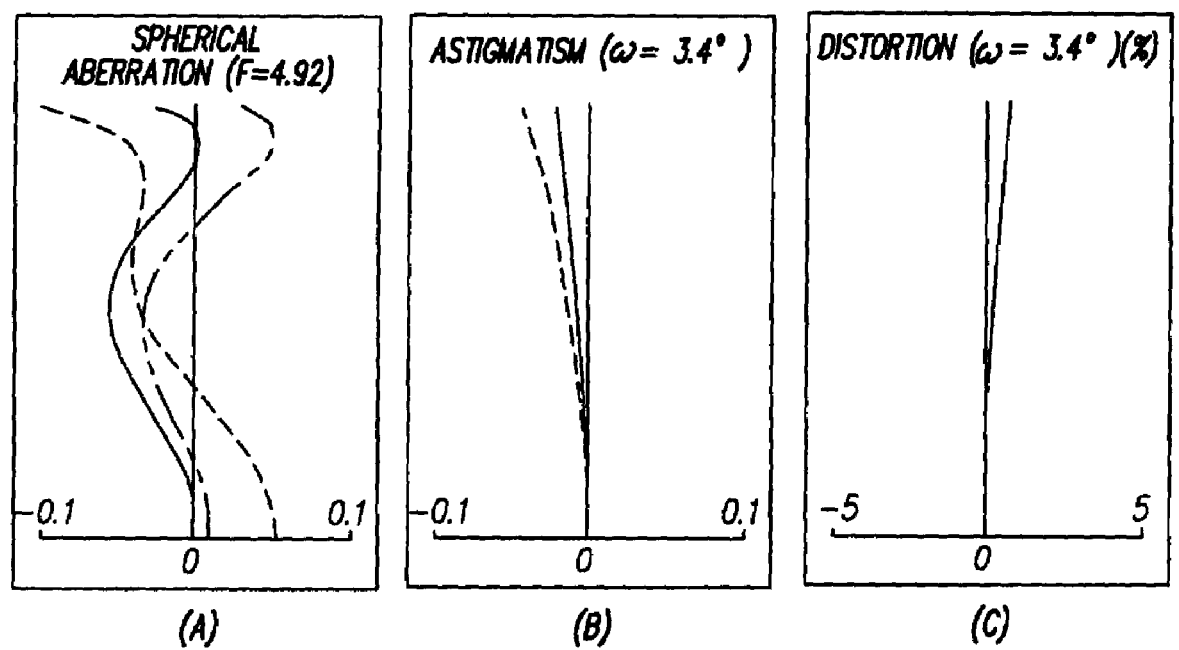
FIGS. 12A to 12C are illustrations showing various aberration diagrams of the long focal length end of the third example.

FIGS. 10 to 12 are aberration diagrams in the third example. Meanings shown by <A> to <C> in FIGS. 10 to 12 are the same as the case of FIGS. 2 to 4.

FOURTH EXAMPLE

Figure 13:
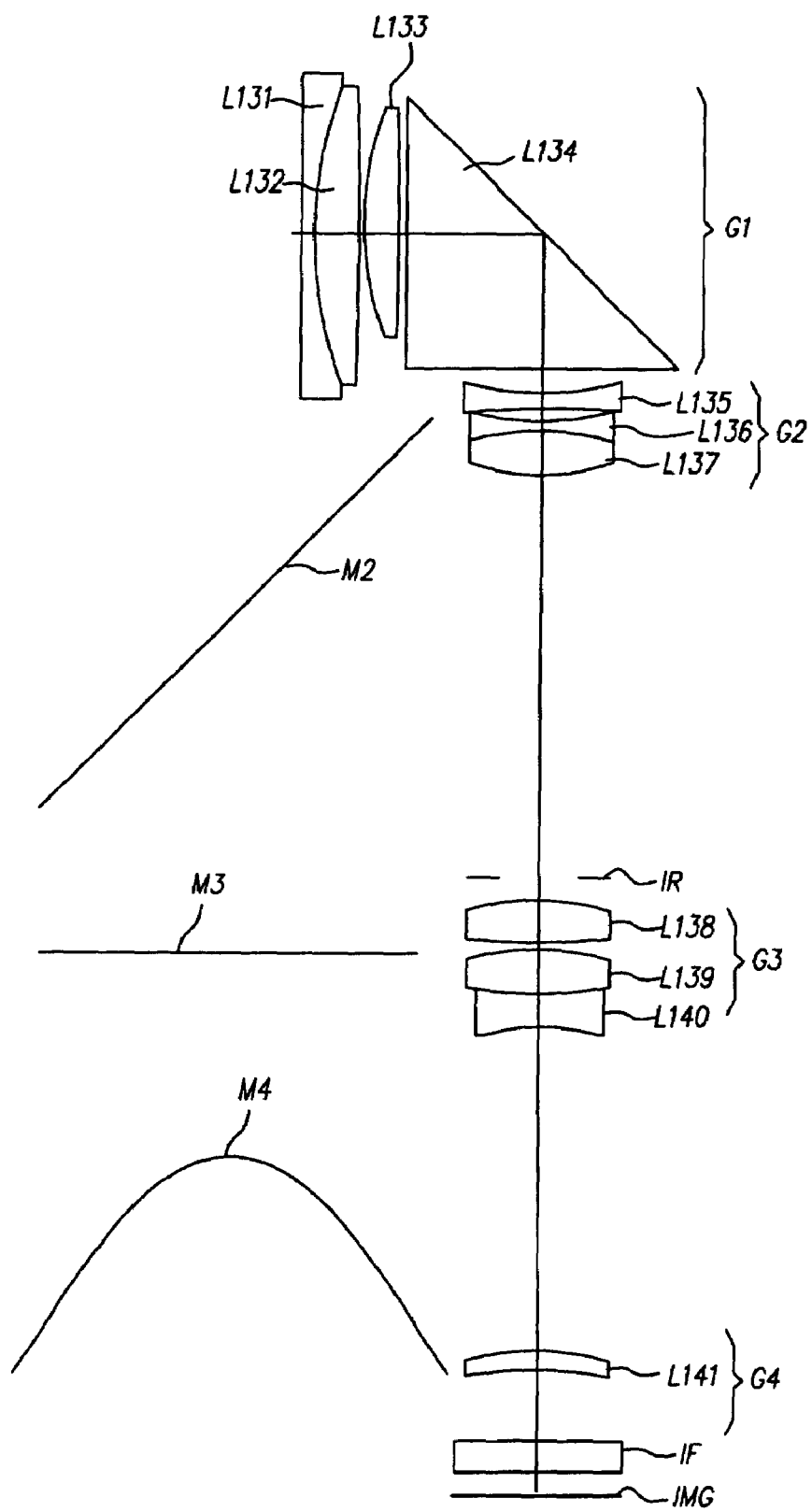
FIG. 13 is an illustration showing the optical-axis cross section of the zoom lens of fourth example.

A fourth example will now be described. As shown in FIG. 13, the fourth example is different from the second example in that the first group of lenses G1 is constituted of a cemented lens obtained by cementing the concave meniscus lens L131 whose convex face is oriented toward the object side and having a negative refracting power and biconvex lens L132 having a positive refracting power, biconvex lens L133 having a positive refracting power, and optical-path bending member L134 from the object side in that order.

Thus, by constituting a group of positive lenses from the cemented lens obtained by cementing the concave meniscus lens L131 and biconvex lens L132 and biconvex lens L133, it is possible to simultaneously correct chromatic difference of magnification generated out of an axis, image face curvature, and axial chromatic aberration and obtain more preferable imaging performance.

Table 13 shows numerical value data of the zoom lens of the fourth example.

TABLE 13

| f = 20.0-34.7-60.01 Fno = 4.92-4.93-4.87 ω = 10.3°-5.9°-3.4° | | | | | | | | |
|---|---|---|---|---|---|---|---|---|
| Lens number | Face number | | Curvature radius R | | Face interval d | | Refraction index ndL | Abbe number vdL |
| L131 | S1 | R1 | 500.000 | d1 | 0.900 | ndL1 | 1.8061 vdL1 | 40.7 |
| L132 | S2 | R2 | 22.301 | d2 | 2.500 | ndL2 | 1.5168 vdL2 | 64.2 |
|  | S3 | R3 | −63.748 | d3 | 0.200 |  | — | — |
| L133 | S4 | R4 | 22.433 | d4 | 2.000 | ndL3 | 1.5891 vdL3 | 61.3 |
|  | S5 | R5 | −180.211 | d5 | 0.300 |  | — | — |
| L134 | S6 | R6 | INF | d6 | 13.000 | ndL4 | 1.8467 vdL4 | 23.8 |
|  | S7 | R7 | INF | d7 | Variable |  | — | — |
| L135 | S8 | R8 | −35.254 | d8 | 0.800 | ndL5 | 1.8161 vdL5 | 46.6 |
|  | S9 | R9 | 19.465 | d9 | 0.600 |  | — | — |
| L136 | S10 | R10 | −32.314 | d10 | 0.700 | ndL6 | 1.8061 vdL6 | 40.7 |
| L137 | S11 | R11 | 7.124 | d11 | 1.800 | ndL7 | 1.8467 vdL7 | 23.8 |
|  | S12 | R12 | 77.809 | d12 | Variable |  | — | — |
| IR | S13 | R13 | — | d13 | 0.500 |  | — | — |
| L138 | S14 | R14 | 8.296 | d14 | 1.800 | ndL8 | 1.5891 vdL8 | 61.2 |
|  | S15 | R15 | −22.074 | d15 | 0.300 |  | — | — |
| L139 | S16 | R16 | 10.811 | d16 | 2.300 | ndL9 | 1.5891 vdL9 | 61.3 |
| L140 | S17 | R17 | −15.633 | d17 | 0.800 | ndL10 | 1.6477 vdL10 | 33.8 |
|  | S18 | R18 | 5.600 | d18 | Variable |  | — | — |
| L141 | S19 | R19 | 14.906 | d19 | 1.500 | ndL11 | 1.4875 vdL11 | 70.4 |
|  | S20 | R20 | 22.659 | d20 | Variable |  | — | — |
| IF | S21 | R21 | INF | d21 | 1.500 | ndL12 | 1.5168 vdL12 | 64.2 |
|  | S22 | R22 | INF |  | — |  | — | — |

Table 14 shows an aspherical coefficient of the biconvex lens L8 constituting the third group of lenses G3 on the face S14 at the object side.

TABLE 14

| Face number | k | A | B | C | D |
|---|---|---|---|---|---|
| S14 | −1.3119E+00 | 0.0000E+00 | −3.0304E−06 | 1.3919E−07 | 0.0000E+00 |

Table 15 shows values of face intervals d7, d12, d18, and d20 variable by zooming at the short focal length end, intermediate focal length, and long focal length end.

TABLE 15

| Focal length f | 20.007 | 34.651 | 60.012 |
|---|---|---|---|
| Face interval d7 | 0.700 | 7.066 | 12.604 |
| Face interval d12 | 13.404 | 7.038 | 1.500 |
| Face interval d18 | 17.000 | 6.000 | 15.000 |
| Face interval d20 | 2.500 | 13.500 | 4.500 |

Table 16 shows values of parameters of conditional expressions (1) to (6) in the fourth example.

TABLE 16

| (1) | f1/fw | 1.86 |
|---|---|---|
| (2) | P4T | 0.8867 |
| (3) | \|β4T/β4w\| | 0.974 |
| (4) | \|D34w/f4\| | 0.202 |
| (5) | nd | 1.8467 |
| (6) | νd | 23.8 |

Figure 14:
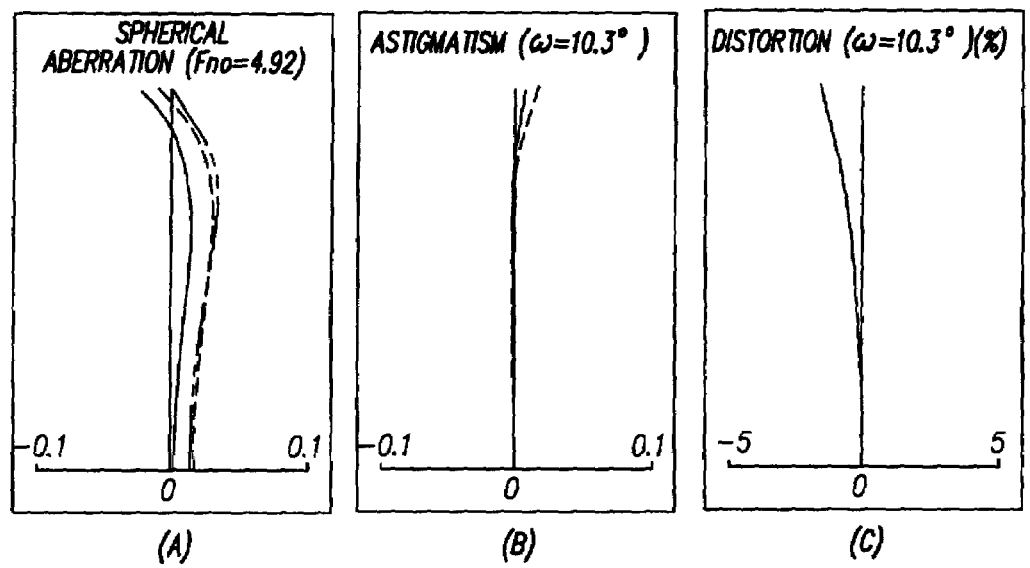
FIGS. 14A to 14C are illustrations showing various aberration diagrams of the short focal length end of the fourth example.
Figure 15:
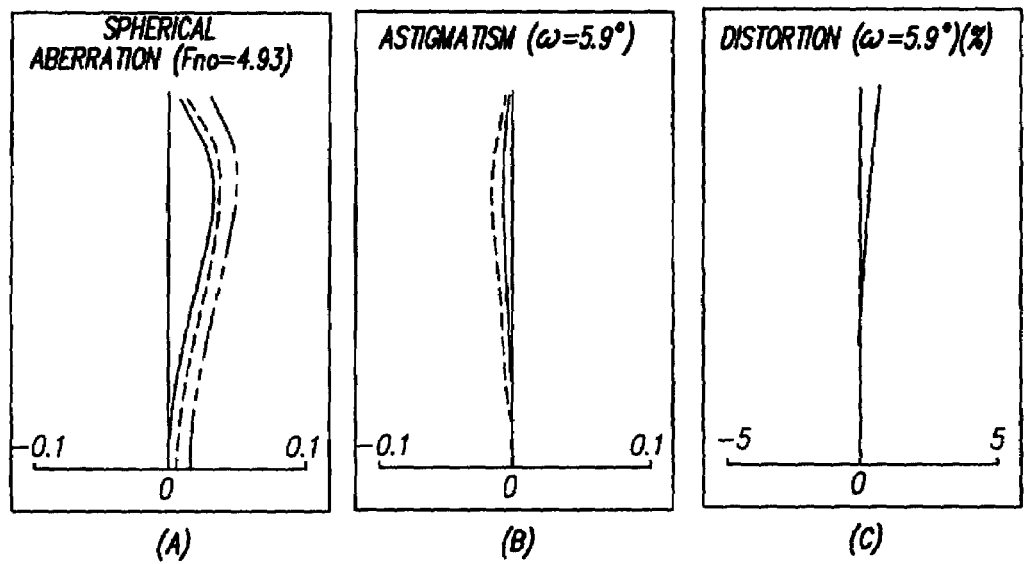
FIGS. 15A to 15C are illustrations showing various aberration diagrams of the intermediate focal length of the fourth example.
Figure 16:
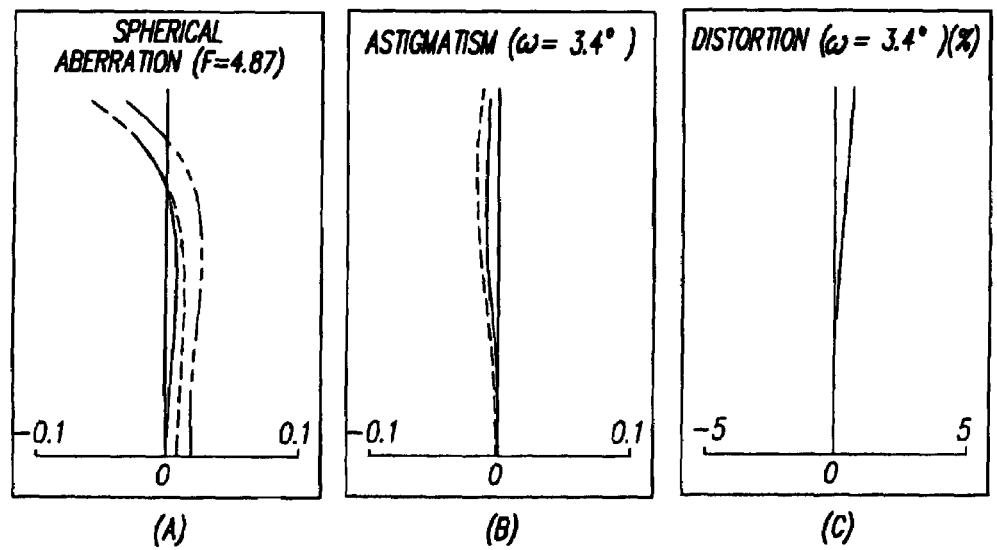
FIGS. 16A to 16C are illustrations showing various aberration diagrams of the long focal length end of the fourth example.

FIGS. 14 to 16 are aberration diagrams in the fourth example. Meanings shown by <A> to <C> in FIGS. 14 to 16 are the same as for FIGS. 2 to 4.

Figure 18:
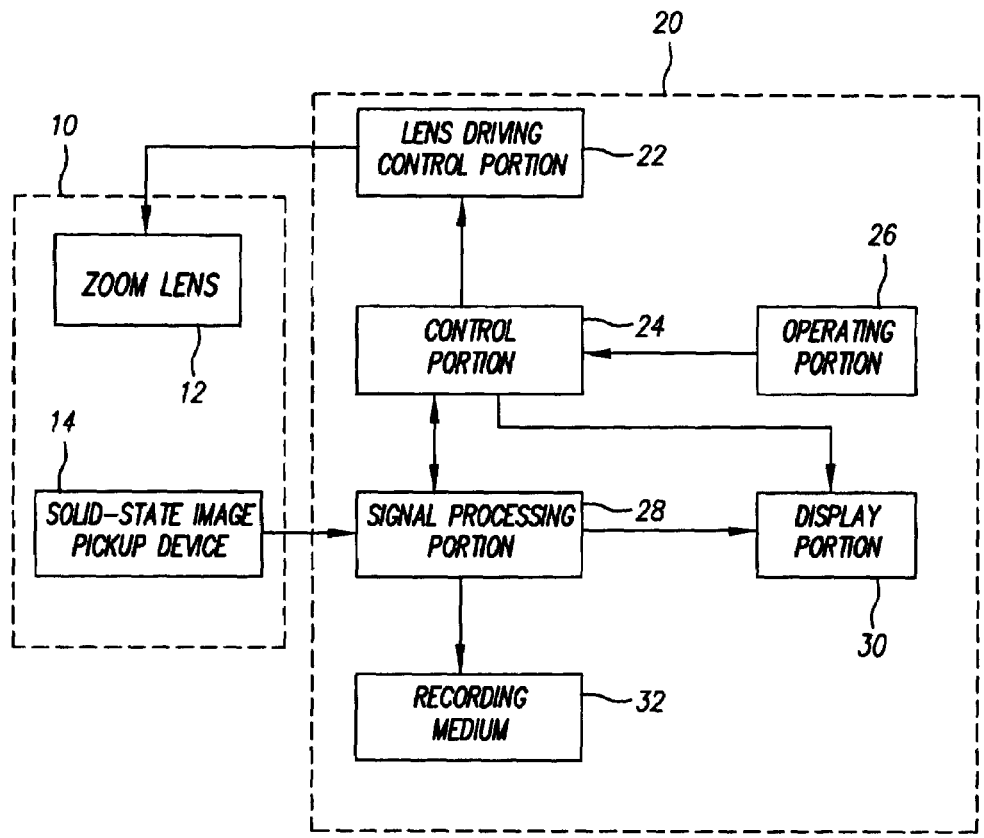
FIG. 18 is an illustration showing a configuration of a digital camera on which a zoom lens is mounted.

An image pickup device on which the zoom lens is mounted is described below. FIG. 18 is an illustration showing a configuration of a digital camera on which the above zoom lens is mounted. The digital camera is roughly divided into a lens block 10 for obtaining the image of an object and body portion 20 for performing various controls necessary for various processing of image-pickup signals and image pickup. The lens block 10 is provided with a zoom lens 12 constituted of the described four lens groups and a solid-state image pickup device 14 for converting an object image acquired by the zoom lens 12 into electrical signals. The solid-state image pickup device 14 outputs the object image converted into electrical signals to the body portion 20 as image data.

In the case of the body portion 20, a control portion 24 executes various processing in accordance with instructions from a user input through an operating portion 26. Moreover, a signal processing portion 28 applies various signal processing such as A/D conversion and noise removal to the image data outputted from the solid-state image pickup device 14. The signal-processed image data is output to a display portion 30 and a recording medium 32. The recording medium 32 is a data storage medium constituted of a memory card or the like and picked-up image data is recorded in the recording medium. The display portion 30 is a display unit such as an LCD and a user confirms a picked-up image through the display portion 30. A lens driving control portion 22 outputs a driving signal to a lens moving mechanism mounted on a zoom lens when focusing or zooming is necessary to instruct movement of lens groups. The motor of the lens moving mechanism mounted on the zoom lens moves a group of lenses in accordance with the instruction.

PART LIST 10 lens block
12 zoom lens
14 image pick-up device
20 body portion
22 lens driving control portion
24 control portion
26 operating portion
28 signal processing portion
30 display portion
32 recording medium
d7 face intervals
d12 face intervals
d18 face intervals
d20 face intervals
G1 first group of lenses
G2 second group of lenses
G3 third group of lenses
G4 fourth group of lenses
IMG image face
IF optical equivalent member
IR lens number
L1 single lens
L2 optical path bending member
L3 biconcave lens
L4 biconcave lens
L5 biconvex lens
L6 biconvex lens
L7 biconvex lens
L8 biconcave lens
L9 biconvex lens
L10 biconcave lens
M2 movement locuses
M4 movement locuses
M4' movement locuses
S12 face
S13 image side
S14 face
<A> spherical aberration
<B> astigmatism
<C> distortion

What is claimed is:

1. A zoom lens comprising:
a first group of lenses having a positive refracting power;
a second group of lenses having a negative refracting power;
a third group of lenses having a positive refracting power; and
a fourth group of lenses having a positive refracting power, the first through fourth groups of lenses being formed in that order from an object side toward an image surface side, wherein
the zoom lens is configured such that zooming is performed by moving the second group of lenses and the fourth group of lenses along an optical axis, and
the first group of lenses comprises:
a group of positive lenses having a positive refracting power; and
an optical path bending member that bends an optical path, the group of positive lenses and the optical path bending member being formed in that order from the object side toward the image surface side;
wherein a relation of d/fw<0.194 is satisfied where d is the maximum image height on an image face and fw is the focal length of all lens systems constituting the zoom lens at a wide angle end.

2. The zoom lens according to claim 1, wherein the group of positive lenses comprises a single lens having a positive refracting power.

3. The zoom lens according to claim 1, wherein the group of positive lenses comprises a cemented lens obtained by cementing a single lens having a negative refracting power with a single lens having a positive refracting power from the object side in that order to the image face side.

4. The zoom lens according to claim 1, wherein
the group of positive lenses comprises a cemented lens obtained by cementing a single lens having a negative refracting power with a single lens having a positive refracting power, and
a single lens having a positive refracting power, arranged in that order from the object side to the image face side.

5. The zoom lens according to any one of claims 1 to 4, wherein
the optical-path bending member is disposed to the most image surface side among the first group of lenses.

6. The zoom lens according to claim 1, wherein
a relationship of 1.0<f1/fw<3.5 is satisfied where f1 is the focal length of all lens systems constituting the first group of lenses disposed to the object side of the optical-path bending member and fw is the focal length of all lens systems constituting the zoom lens at the wide angle end.

7. The zoom lens according to claim 1, wherein
the fourth group of lenses is moved to the third group of lenses along the optical axis when focusing from an infinite object to a near range object, and
the following relationships are satisfied:

$0.55 < \beta 4_T < 0.92$, $0.8 < |\beta 4_T / \beta 4_W| < 2.0$, and $0.04 < |D34_W / f4| < 0.4$ where;

$\beta_{4W}$ is the lateral magnification of the fourth group of lenses when focusing on an infinite object at a wide angle end, $\beta 4_T$ is the lateral magnification of the fourth group of lenses when focusing on an infinite object at a telephoto end, $D34_W$ is the air gap between the third group of lenses and the fourth group of lenses at a wide angle end, and f4 is the synthetic focal length of the fourth group of lenses.

8. The zoom lens according to claim 1, wherein
the optical-path bending member is a prism using a glass material for satisfying a relationship of 1.6<nd<1.85 and vd<40, where nd is the refractive index of the optical-path bending member at a d-line and vd is the Abbe number of the optical-path bending member on the d-line.

9. A camera provided with the zoom lens described in claim 1 and a solid-state image pickup device disposed to the image face side of the zoom lens.

* * * * *